(12) United States Patent
Krainz et al.

(10) Patent No.: US 9,009,013 B2
(45) Date of Patent: Apr. 14, 2015

(54) METHOD AND DEVICE FOR VERIFICATION OF AN AUTOMATION SYSTEM

(75) Inventors: Manfred Krainz, Graz (AT); Christoph Weidinger, Graz (AT); Gregor Klaric, Graz (AT)

(73) Assignee: AVL List GmbH, Graz (AT)

( * ) Notice: Subject to any disclaimer, the term of this patent is extended or adjusted under 35 U.S.C. 154(b) by 142 days.

(21) Appl. No.: 12/662,592

(22) Filed: Apr. 23, 2010

(65) Prior Publication Data

US 2010/0292974 A1 Nov. 18, 2010

(30) Foreign Application Priority Data

Apr. 23, 2009 (AT) .................. GM257/2009

(51) Int. Cl.
G06G 7/48 (2006.01)
G05B 23/02 (2006.01)
G05B 17/02 (2006.01)

(52) U.S. Cl.
CPC ............ G05B 23/0256 (2013.01); G05B 17/02 (2013.01); G05B 2219/23452 (2013.01); G05B 2219/24038 (2013.01)

(58) Field of Classification Search
USPC .................................................. 703/2, 6–21
See application file for complete search history.

(56) References Cited

U.S. PATENT DOCUMENTS

| 7,908,123 B2 | 3/2011 | Maebayashi et al. |
| 7,962,228 B2 | 6/2011 | Fukuda |
| 8,036,761 B2 | 10/2011 | Higuchi et al. |
| 2002/0029136 A1 | 3/2002 | Hagiwara et al. |
| 2005/0187670 A1 | 8/2005 | Katayama et al. |
| 2006/0225710 A1 | 10/2006 | Taglialatela-Scafati |
| 2007/0038422 A1 | 2/2007 | Wang et al. |
| 2007/0255482 A1 | 11/2007 | Fukuda |
| 2008/0275682 A1 | 11/2008 | Langer |
| 2009/0012763 A1 | 1/2009 | Langer et al. |
| 2009/0132208 A1 | 5/2009 | Ukyo et al. |
| 2009/0306866 A1 | 12/2009 | Malikupoulos |

(Continued)

FOREIGN PATENT DOCUMENTS

| JP | 9185519 | 7/1997 |
| JP | 2004348596 | 12/2004 |

(Continued)

OTHER PUBLICATIONS

Bogosyan et al. "A Novel Method Validation and Estimation Approach for Hybrid Serial Electric Vehicles", IEEE Transactions on Vehicular Technology, vol. 56, No. 4, Jul. 2007.*

(Continued)

*Primary Examiner* — Saif Alhija
(74) *Attorney, Agent, or Firm* — Dykema Gossett PLLC

(57) ABSTRACT

Specific tests on vehicles or parts thereof must be performed and analyzed according to a prescribed standard. The verification of an automation system for performing such a test and the final result of such a test is a complex and time-consuming procedure, however. So as not to have to repeat the complex verification in the case of changes in the automation system, it is proposed that the correctness of a test run only be checked once and in the case of established correctness, the reference data defining the test run be stored as the reference standard. If a change is performed in the automation system, it is sufficient to perform the test run again and to compare the reference data of the reference standard to the new reference data.

17 Claims, 1 Drawing Sheet

(56) References Cited

U.S. PATENT DOCUMENTS

| | | |
|---|---|---|
| 2010/0088058 A1 | 4/2010 | Fricke |
| 2010/0100365 A1 | 4/2010 | Moriyama |
| 2010/0191515 A1 | 7/2010 | Walenta et al. |

FOREIGN PATENT DOCUMENTS

| | | |
|---|---|---|
| WO | 0041050 | 7/2000 |
| WO | 2008152010 | 12/2008 |

OTHER PUBLICATIONS

Pasquier et al. "Validating Simulation Tools for Vehicle System Studies Using Advanced Control and Testing Procedure", 2007.*

H. Hanselmann et al., "Real-Time Simulation Replaces Test Drives" in Test & Measurement World, Cahners Publishing, vol. 16, No. 3, Feb. 15, 1996, pp. 35, 36, 38 40.

English translation of AT 505326 A2, dated Dec. 2008.

English translation of DE 102007039691 A1, dated Feb. 2009.

English abstract of JP9185519.

English abstract of JP2004348596.

R. Isermann et al., "Design of Computer Controlled Combustion Engines" in Mechatronics, vol. 13, No. 10 (Dec. 2003) pp. 1067-1089.

Antonis I. Antoniou, et al. Modeling and Simulation of Various Hybrid-Electric Configurations of the High-Mobility Multipurpose Wheeled Vehicle (HMMWV); IEEE Mar. 2007, pp. 459-465.

English Abstract of WO2008/152010.

Non-Final Office Action issued in U.S. Appl. No. 12/452,011 dated Jun. 21, 2012.

Non-Final Office Action issued in U.S. Appl. No. 12/452,011 dated Oct. 1, 2013.

Final Office Action issued in U.S. Appl. No. 12/452,011 dated Feb. 12, 2013.

* cited by examiner

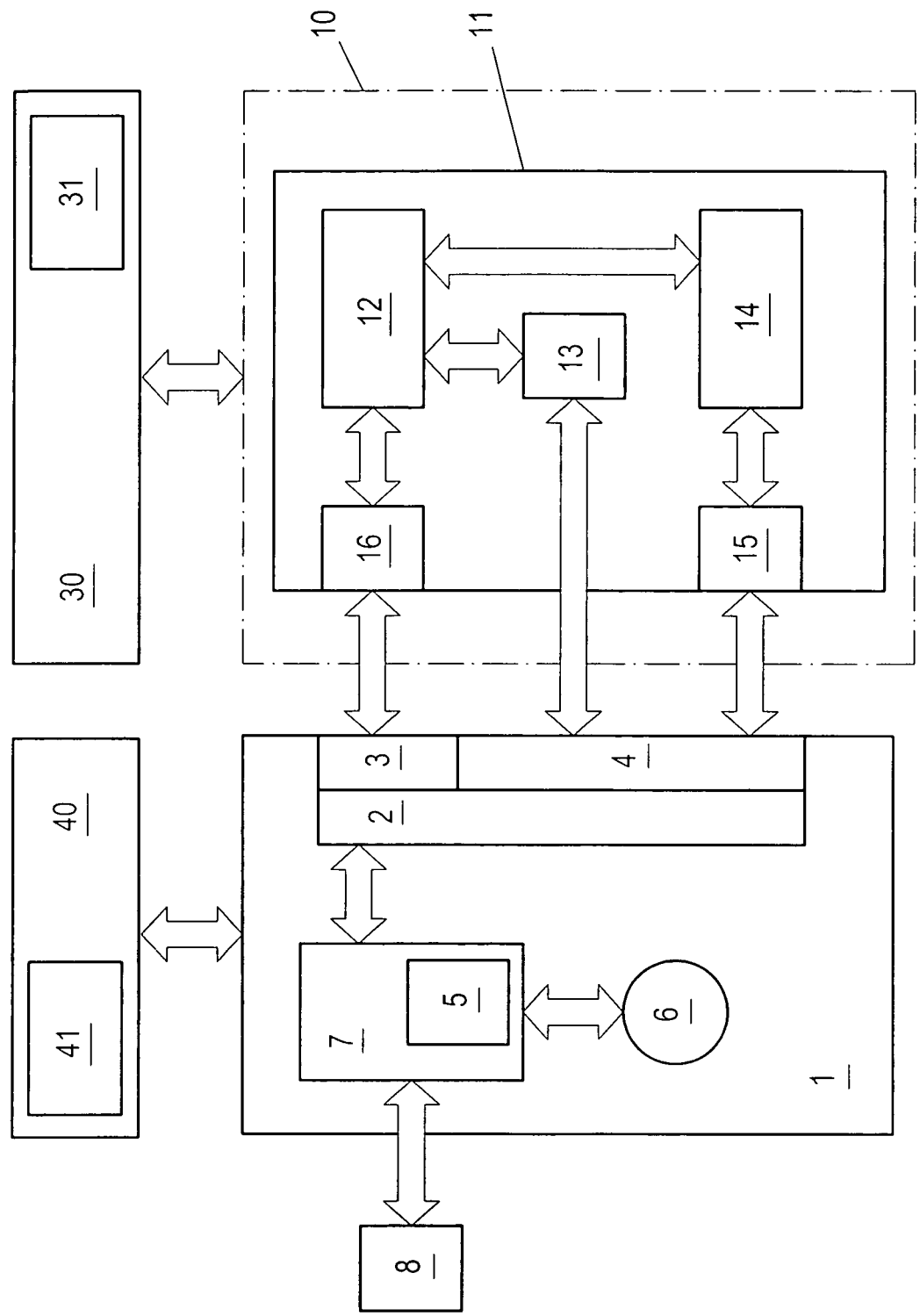

METHOD AND DEVICE FOR VERIFICATION OF AN AUTOMATION SYSTEM

BACKGROUND OF THE INVENTION

1. Field of the Invention

The current invention relates to a method for the verification of an automation system for the performance of a fixed test run which provides data or measured values and/or a result calculation based on these data or measured values and a device for this purpose.

2. The Prior Art

Specific tests on vehicles must be performed according to a predefined and established standard. Such standards are prescribed by lawmakers, for example, in order to determine the exhaust emissions of a vehicle, for example. These standards includes guidelines of what and how something is to be measured (test run) and how the measurement results must be processed and/or interpreted (result calculation). The test run itself occurs on a test stand having a test subject (internal combustion engine, drivetrain, vehicle, etc.), on which the predefined test run is run. These test stands are controlled and regulated by an automation system, such as the PUMA family of the applicant, completely automatic test runs being able to be generated and executed. The difficulty in such test runs is proving or establishing that the test run, or the further processing of the measurement results and the final result arising therefrom, correspond to the predefined guidelines. Such a proof is unavoidable, however, in order to verify the test system (automation system, test stand, test run) for the performance of the desired test. Therefore, a very large amount of time must be invested for each new apparatus of such a test system in order to ensure this.

The automation software runs on the automation system, which is or must be updated more or less regularly, however. It is also conceivable that the legal guidelines for performing a test run are changed. Any intervention in the existing (and already verified) automation system puts the correctness of the test results into question again and the adherence to the predefined guidelines by the entire system must be cumbersomely proven again.

It is therefore the object of the present invention to disclose a method which allows a verification of the automation system and/or the result calculation for a fixed test run to be performed in a simple and reliable manner.

SUMMARY OF THE INVENTION

According to the invention the correctness of a test run is only checked once and, in the case of established correctness, the reference data defining the test run are stored as a reference standard. If a change is performed in the automation system, it is sufficient to perform the test run again and to compare the reference data of the reference standard to the new reference data. The verification can thus be performed automatically, easily, and rapidly in the case of a change of the automation system. Overall, a cycle for a required renewed verification of an automation system can thus be significantly simplified and shortened in relation to a predefined guideline.

The calculated final results of the performed test run and/or the configuration of the simulation apparatus and/or a definition of the manual or automated input for controlling the test stand and/or data or measured values generated by the simulation apparatus for the test run and/or a definition of the test run are preferably stored as the reference data.

To check the correct function of the automation apparatus, the correct activation of the test environment and/or the correct acceptance and processing of the data or measured values and/or the analysis algorithms of the result calculation are preferably checked, which can be performed manually or partially manually and also with the support of specific tools.

If conclusions about the relevant problem area are drawn by analysis of the reference data in case of error, a possible error source can be identified or isolated, whereby the error search is significantly simplified and accelerated. This further simplifies and shortens the cycle for a required renewed verification of an automation system in relation to a predefined guideline.

A storage unit is advantageously provided in the automation system, in which various reference standards are stored in order to be able to access specific reference standards rapidly.

A host system can advantageously be provided which is connected to the automation system, whereby it is possible via the host system to generate and manage test runs via suitable operating interfaces and/or to store or analyze test data or test runs and/or to play predefined test runs or configuration data on the automation system and/or to connect multiple automation systems to one another. For this purpose, a data memory is particularly advantageously provided in the host system, in order to be able to access already existing test runs and configurations easily.

A specific configuration of a simulation apparatus having all test models and device models can be performed very easily using a simulation configurator, whereby the configuration and parameterization of the simulation environment are simplified. A further simplification can be achieved if a test and/or device model databank is provided in the simulation configurator, because then prefinished parts must only still be assembled and optionally parameterized.

The present invention is described hereafter on the basis of non-restrictive FIG. 1, which schematically shows a preferred exemplary embodiment, and which shows a block diagram of an automation system having an automation apparatus and having simulated test stand environment.

The automation apparatus 1 of an automation system, as shown in FIG. 1, can contain various components in greatly varying combinations depending on the application, e.g., tests of the exhaust gas emissions of a vehicle or internal combustion engine (test subject), e.g., in this example, a control unit 2 for the control of a load machine (dynamometer) and/or a test subject, interfaces 3 for the communication with the test stand 11 or apparatuses on the test stand 11, device drivers for attached data acquisition devices, such as measuring devices, etc. An analysis unit 7 can also be provided in the automation apparatus 1, which processes the data or measured values obtained from the test stand 11. The control unit 2 and the analysis unit 7 may also be combined into one unit. The automation software 5, which is also responsible, inter alia, for the internal control of the individual components, but also for the provision of an HMI interface, e.g., for the input or display of measured values or system variables, runs in the automation apparatus 1, e.g., in the analysis unit 7. Many functions of the components of the automation apparatus 1 are implemented in the automation software 5 as executable programs.

In order to be able to test and/or check the automation apparatus 1 and the activation of the test stand 11, it is provided that the test stand 11 having test subject and all required components is not actually constructed, but rather simulated. For this purpose, a simulation apparatus 10 is provided in the automation system, such as suitable simulation hardware, e.g., a PC, dSpace®, etc., in which the components of the test stand 11 and the test subject, such as an internal combustion engine, exhaust gas pathways (catalytic converters, constant volume sampler (CVS), diluent tunnel, exhaust gas outlets) for gasoline, diesel, and other fuels, measuring devices, etc., are simulated in the form of suitable test models 12. The behavior of specific components of the test stand 11 or the test subject (such as the emission behavior of an internal combustion engine) can also be simulated by the test models 12. The test models 12 may be mathematical or physical models, for example, and may be implemented, for example, in Matlab/Simulink®. The test models 12 are typically executable programs, which run on the simulation software and deliver simulation data. However, there are no restrictions in the possible implementation of the test models 12 and the simulation hardware.

For the example of an engine test stand for testing legal exhaust gas cycles or a roller test stand for vehicle verification, the test models 12 are used, for example, for the physical simulation of the exhaust gases according to the ideal gas law. The simulation quality of the test models 12 can be refined as desired by the component-based approach. If desired and necessary, specific test models 12 or parts of the test model 12 can also be replaced by a proprietary customer model of the user. The simulation quality used is to be at least sufficient for the guidelines or laws on which the test is based, such as EPA1065.

It is also advantageous to divide the simulation of the data acquisition devices, such as measuring devices, used in the test stand 11. The device simulation is preferably divided into a model-based simulation of the physical device behavior (such as the simulation of the bag of the CVS in the form of the time curve of the content of the bag upon activation by the automation apparatus 1, simulation of the time curve of the concentration of the exhaust gas components, etc.), a simulation of the behavior in the case of the calibration, and a simulation of the communication to the automation apparatus 1. For this purpose, device models 14 and device communication models 15 may be provided in the simulation apparatus 10, the device models 14 simulating the physical behavior and/or the behavior in the case of calibration and the device communication models 15 simulating the communication with the device drivers 4 of the automation apparatus 1 (such as AK protocol on TCP/IP or V24), as shown in FIG. 1. However, the separate simulation of the communication can also be dispensed with and a device model 13 for communication and physical behavior, which communicates directly with the device drivers 4 of the automation apparatus 1, is sufficient.

The simulation in the simulation apparatus 10 is performed in such a manner that the simulated behavior of the devices corresponds to the actual device behavior in the scope of the quality required for the correct analysis of the measurement data. The device models 13, 14 generate data or measured values for this purpose, as a function of the simulation of the test stand 11 and/or the test subject by the test models 12. The dependence is to be understood in such a manner that a specific test stand or test subject state naturally also requires specific data of the device model. The device models 13, 14 and the test models 12 may also exchange data for this purpose. No difference from the real world can be established at the interface between simulation apparatus 10 and real automation apparatus 1. This relates to both the communication and also the data or measured values provided by the simulation apparatus 10 (in the scope of the simulation quality).

An I/O interface 16 can also be provided in the simulation apparatus 10 for the communication of the automation apparatus 1 with the simulation apparatus 10, which communicates with the interface 3 of the automation apparatus 1 and thus allows a direct communication between automation apparatus 1 and test models 12.

A host system 40 can be superior to the automation system, which is used, for example, for generating and managing test runs via suitable operating interfaces, storing and analyzing test data or test runs in a data memory 41, playing stored test runs or configuration data on the automation apparatus 1, connecting multiple automation apparatuses 1 or test stands to one another to form a test factory, etc.

The simulation apparatus 10 can be adapted by simple configuration to the various test stand types, such as engine test stand, roller test stand. Various test stand components and various test subjects may thus be combined in the form of test models 12 and device models 13, 14 and parameterized according to the requirements. The real automation apparatus 1 can thus be used for various testing purposes or test runs and various test stand types. For this purpose, for example, a simulation configurator 30 having corresponding I/O units or I/O interfaces, such as a PC, can also be provided. Models of specific test stand types, test subjects, and/or components thereof and/or specific data acquisition devices may be stored therein in a test and/or device model bank 31, which may be retrieved, combine, and parameterized. The simulation configurator 30 can also be integrated in the host system 40, of course.

Because the simulation of the test environment (test stand, test subject, components, measuring devices, etc.) on the simulation apparatus 10 reproducibly delivers the same results in the case of the same activation by the automation apparatus 1, it can be used to verify the automation system, i.e., for example, the automation apparatus 1 and/or the result calculation, from the data or measured values delivered from the simulation.

For this purpose, for a fixed test run, in a first step the fixed test run is performed using the simulation of the test environment. The proper function of the simulation apparatus 10 has preferably already been tested and ensured beforehand. In this step, the function of the automation apparatus 1 can be checked, i.e., for example, whether the activation of the test environment (test stand, test subject, components, measuring devices, etc.) is correct, whether the data or measured values are correctly accepted and processed, etc. In addition, the analysis algorithms of the result calculation, which calculate the final results of the test from the data or measured values, may be checked. This checking is typically a manual or partially manual procedure, which can occupy a very long time and is susceptible to error. The automation apparatus 1 can provide an HMI interface to I/O devices 8 to support the checking, via which the data and measured values, which are transmitted between the automation apparatus and the simulation apparatus 10, can be accessed. The configuration and parameterization of the simulation apparatus 10 can also be accessed via such an HMI interface. It is also conceivable to use specific tools, for example, for data analysis, data preparation, calculation tools, etc., for the checking.

If the proper function of the automation apparatus 1 and/or the result calculation has been proven, a reference standard is prepared in which reference data defining the simulation apparatus 10 and/or the performed test run are stored. For example, the final results of the performed test run, which are calculated from the data or measured values obtained from the test run, may be stored in the reference standard, for example, in the form of a result report. The reference standard can further include the configuration of the simulation apparatus 10, i.e., essentially a model of the test stand with test subject, and components, devices, and measuring devices situated thereon, etc., and/or the definition of the input for the control of the test stand, such as manual inputs of the test stand operator (such as 3-phase or 4-phase driving of the test run) and/or automated inputs of automated activation apparatuses (such as a switching robot or a driving robot). The data or measured values obtained by the simulation apparatus 10 for the test run may also be stored in the reference standard, only a part of these data or measured values also being able to be stored, of course. A definition of the test run, i.e., for example, how the test stand 11 having test subject is activated by the automation apparatus 1 to perform the test run, can also be stored in the reference standard.

This reference standard can now simply be used in order to check a change in the automation system, for example, in the automation apparatus 1 in the case of an update of the automation software or a change of the result calculation (for example, in the case of a change of the legal specifications). For this purpose, the test run on which the reference standard is based must only be repeated using the changed automation system, for example, in the case of a changed automation apparatus 1, and the reference data of the reference standard must be compared to the newly generated reference data, for example, in the analysis unit 7 of the automation apparatus 1, in that, for example, the calculated final results (e.g., in the form of the result reports) of the reference standard are compared to one another. In the case of correspondence, the automation system is already verified. If the result reports are different, an attempt can be made by analyzing the differences to isolate the error source and thus find it more rapidly. It is thus even possible through the simulation to verify automation systems of different manufacturers.

Through an analysis of the reference data, such as the final results, in case of error, conclusions may also be drawn about the relevant problem area, because specific error pictures can be associated with a specific error source. The simulation apparatus 10 can thus also be used, on the one hand, for error analysis and, on the other hand, as a tool for quality control. In addition, the reaction and analysis of the automation apparatus 1 to device errors and the reaction and analysis of the automation apparatus 1 to operating errors can also be tested.

A test run can also be run against the simulation environment on the real test stand before and/or after an update of the automation software and/or the analysis software, in order to thus ensure that the test stand delivers the same results after the update.

For this purpose, a storage unit 6, such as a databank, can also be provided in the automation system, for example, in the automation apparatus 1, in which various reference standards for various test runs may be stored. This allows a specific reference standard to be retrieved and compared to current test data very rapidly as needed. This memory unit 6 and/or the analysis unit 7 may also be situated elsewhere, of course, for example, in an external unit, such as the higher-order host system 40, which would allow various automation apparatuses 1 (for example, a testing factory) to access stored reference standards and/or to verify automation systems.

The invention claimed is:

1. A system for verifying an automation system, said verifying system comprising:
   a simulation apparatus;
   an automation apparatus, wherein the automation apparatus and the simulation apparatus are connected to one another via an interface; the simulation apparatus is activated by the automation apparatus according to a test run to be performed; the simulation apparatus simulates (1) a test stand and a test subject to be tested with a test model, and (2) a data acquisition device situated on the test stand for acquiring data or a measured value with a device model; and, data or measured values generated by the test model and the device model are transmitted to the automation apparatus via the interface;
   a storage unit in which a reference standard for the test run is stored after the proper function of the automation apparatus and/or the result calculation for the performed test run has been established, whereas first reference data defining the simulation apparatus and/or the performed test run is stored in the reference standard, the test run being repeated if the automation system has been changed, whereas second reference data is generated, and
   an analysis unit which compares the first reference data stored in the reference standard to the second reference data and which verifies the changed automation system if the compared first and second reference data correspond,
   wherein the verifying system is configured for performance of the test run and delivering data or measured values and/or a result calculation based on these data or measured values.

2. A method for verifying the operation of an automation system used in controlling a test run on a test subject on a test stand when the automation system is changed from a first configuration to a second configuration, said method comprising:
   (1) providing a simulation apparatus configured to provide data and measured values of a simulated test subject on a simulated test stand when a test run is performed by said automation system, said simulation apparatus comprising hardware,
   (2) controlling said simulation apparatus using said automation system in said first configuration, in accordance with a performed test run,
   (3) compiling first reference data which includes at least one of first data and measured values from said simulation apparatus during step (2), calculated results from said first data or measured values, configuration of the simulation apparatus, definition of manual or automated inputs for control of the test stand, and definition of the test run,
   (4) changing said automation system from said first configuration to a second configuration different from said first configuration,
   (5) controlling said simulation apparatus using said automation system with said second configuration, in accordance with said performed test run,
   (6) compiling second reference data which includes at least one of second data and measured values from said simulation apparatus during step (5) calculated results from said second data or measures values, configuration of the simulation apparatus, definition of manual or automated inputs for control of the test stand, and definition of the test run, and
   (7) comparing said first and second reference data to confirm correspondence and verify that said automation system satisfied a predetermined standard of operation.

3. A method for verifying an automation system, said method comprising:
   providing a previously verified simulation apparatus, said simulation apparatus comprising hardware and models;
   providing an automation system, said automation system comprising a first configuration, said first configuration including first hardware and first software;

controlling said simulation apparatus with said automation system comprising said first configuration in accordance with a predefined test run, said controlling including controlling said models;

acquiring first configuration results corresponding to said predefined test run controlled with said automation apparatus comprising said first configuration;

checking for proper operation of said automation system comprising said first configuration;

storing said first configuration results as a reference standard if said automation system comprising said first configuration operated properly;

modifying at least one of said first hardware and said first software of said first configuration to create an unverified second configuration, said unverified second configuration comprising at least one of unverified hardware and unverified software;

controlling said previously verified simulation apparatus, comprising said models, with said automation system having said unverified second configuration in accordance with said predefined test run, said controlling including controlling said models of said previously verified simulation apparatus;

obtaining unverified second configuration results corresponding to said predefined test run controlled with said automation apparatus comprising said unverified second configuration;

verifying said automation system comprising said unverified second configuration if said second configuration results correspond to said reference standard.

4. The method of claim 3, wherein said previously verified simulation apparatus comprises a measuring device model.

5. The method of claim 4, wherein said measuring device model is divided into a physical device behavior portion, a calibration portion, and a communication portion.

6. The method of claim 3, wherein said previously verified simulation apparatus comprises an exhaust gas pathway model.

7. The method of claim 3, wherein a simulation provided by said previously verified simulation apparatus sufficiently corresponds to actual device behavior to allow for correct analysis of said first test run results and/or said unverified second configuration results.

8. The method of claim 3, wherein said previously verified simulation apparatus is configured to receive an activation from said automation system, to reproducibly deliver a single set of results in response to said activation, and to deliver a different set of results in response to a different activation.

9. The method of claim 3, wherein said first configuration results include information concerning activation of said models of said simulation apparatus.

10. The method of claim 3, wherein said checking for proper operation of said automation system comprising said first configuration comprises manually checking at least a portion of said first configuration results.

11. The method according to claim 2, including checking the correct activation of the test environment and/or correct acceptance and processing of the data or measured values and/or the analysis algorithms of the result calculation to check the correct function of the automation apparatus.

12. The method according to claim 2, including analyzing the reference data in case of error.

13. The device according to claim 1, including in the automation system a storage unit in which various reference standards are stored.

14. The device according to claim 1, including a host system which is connected to the automation apparatus and/or the simulation apparatus.

15. The device according to claim 14, including a data memory in the host system.

16. The device according to claim 1, including a simulation configurator which is connected to the automation apparatus and/or the simulation apparatus.

17. The device according to claim 16, including a test and/or device model databank in the simulation configurator.

* * * * *